Figure 1:
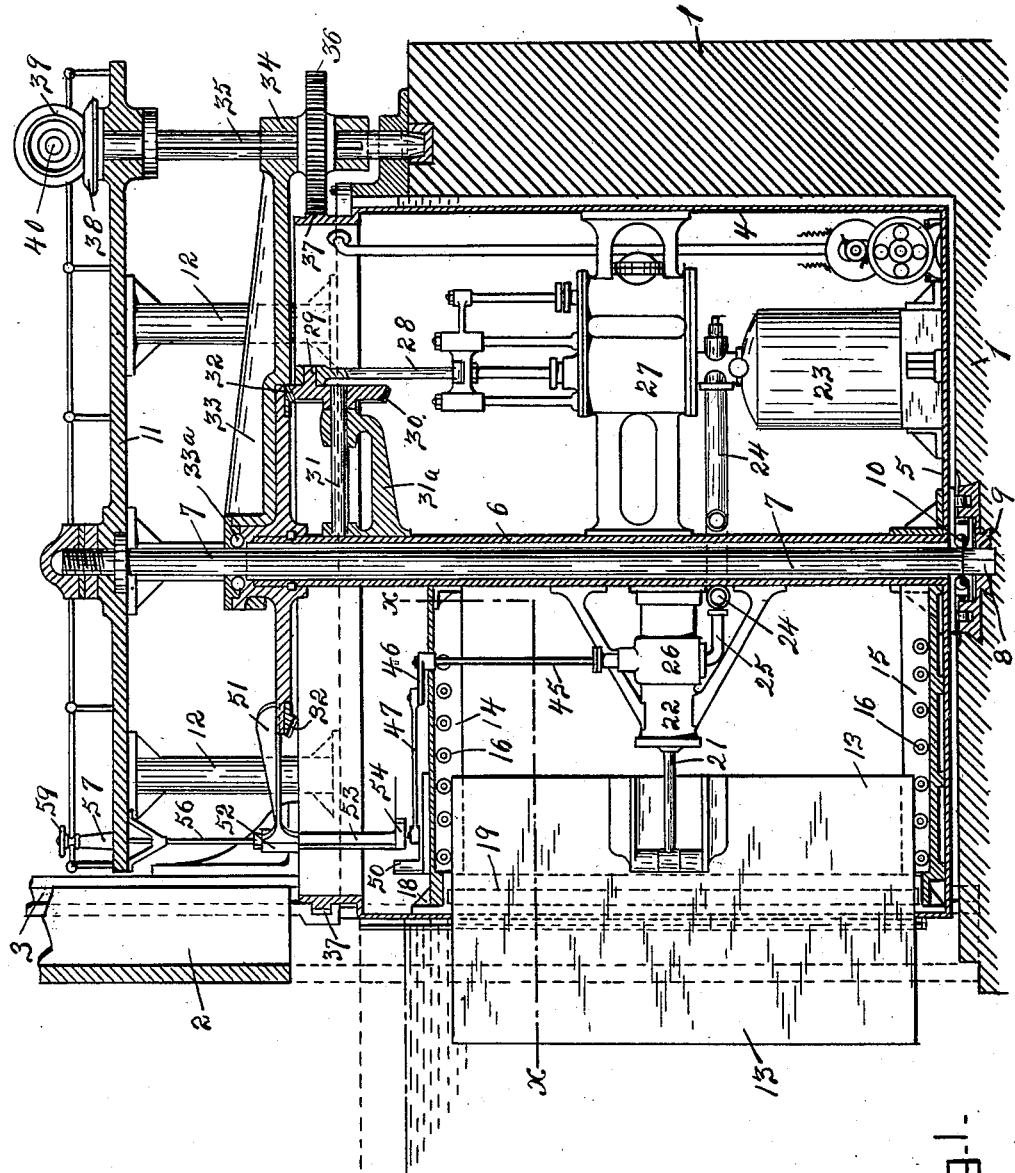

T. SYMMONDS.
CURRENT WATER WHEEL.
APPLICATION FILED OCT. 1, 1904. RENEWED DEC. 18, 1907.

1,077,318.

Patented Nov. 4, 1913.

3 SHEETS—SHEET 1.

WITNESSES

INVENTOR.
THEOPHILUS SYMMONDS
BY
ATTORNEY.

T. SYMMONDS.
CURRENT WATER WHEEL.
APPLICATION FILED OCT. 1, 1904. RENEWED DEC. 18, 1907.
1,077,318.
Patented Nov. 4, 1913.
3 SHEETS—SHEET 2.
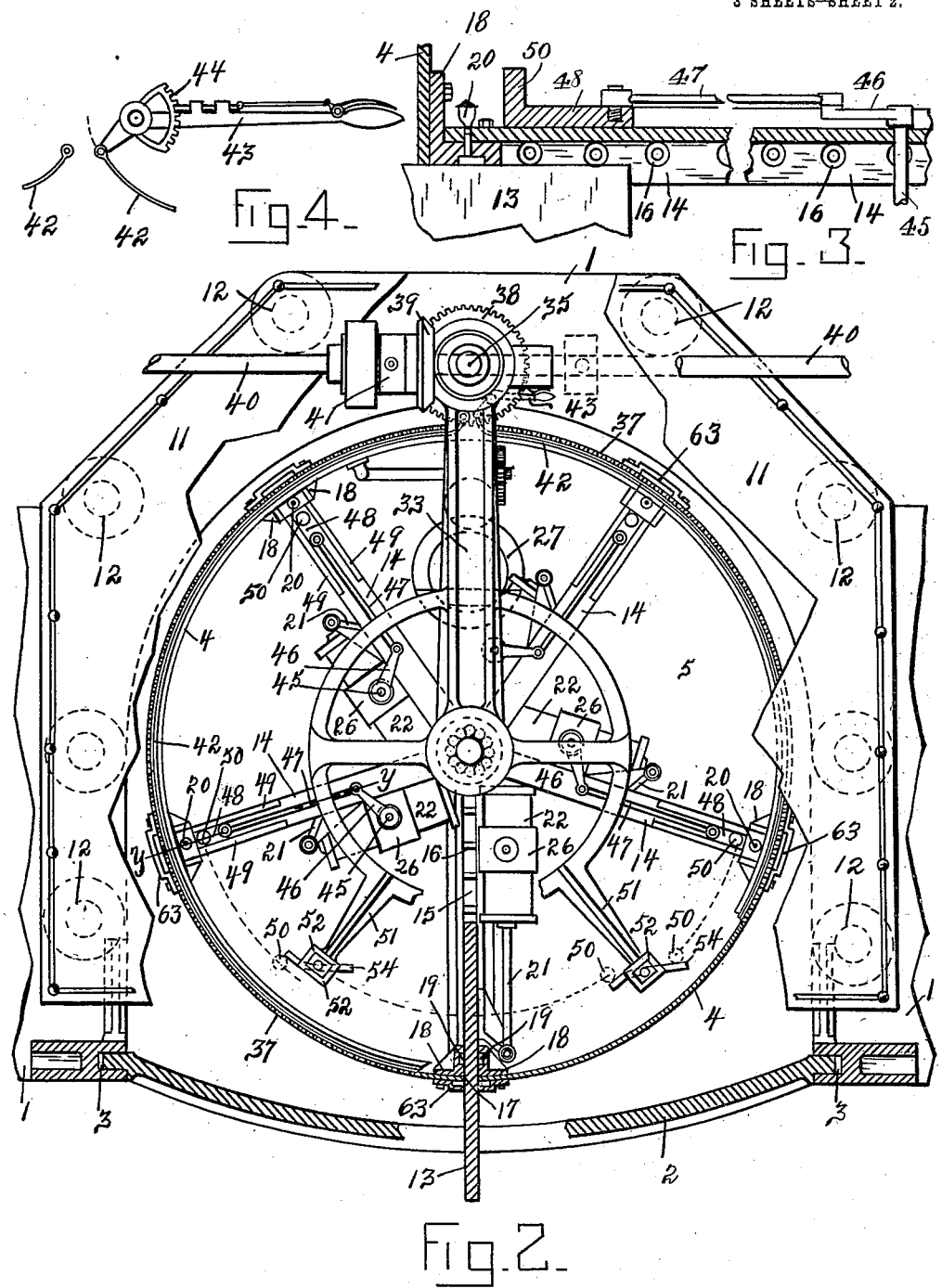
WITNESSES:
INVENTOR.
THEOPHILUS SYMMONDS
BY
ATTORNEY.

T. SYMMONDS.
CURRENT WATER WHEEL.
APPLICATION FILED OCT. 1, 1904. RENEWED DEC. 18, 1907.
1,077,318.
Patented Nov. 4, 1913.
3 SHEETS—SHEET 3.
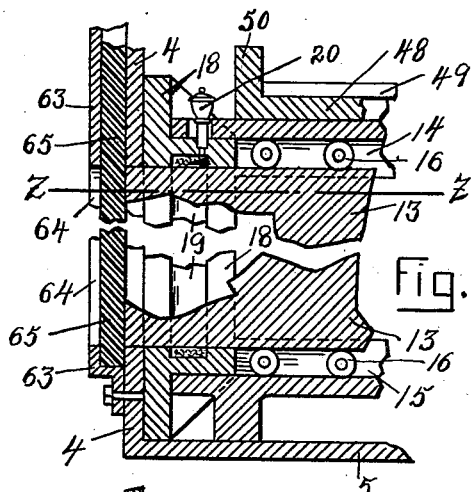
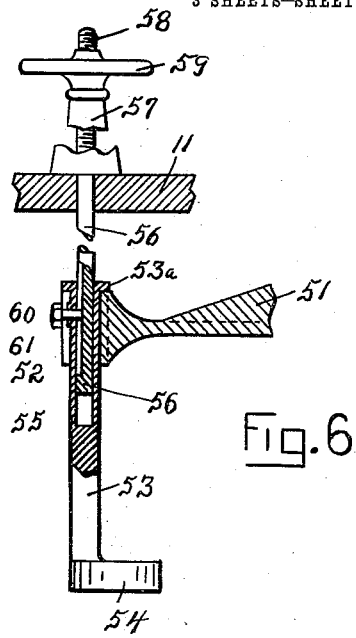
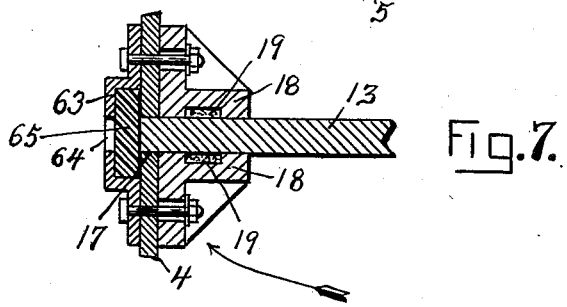

UNITED STATES PATENT OFFICE.

THEOPHILUS SYMMONDS, OF BUFFALO, NEW YORK.

CURRENT WATER-WHEEL.

1,077,318. Specification of Letters Patent. Patented Nov. 4, 1913.

Application filed October 1, 1904, Serial No. 226,765. Renewed December 18, 1907. Serial No. 407,043.

*To all whom it may concern:*

Be it known that I, THEOPHILUS SYMMONDS, citizen of the United States, residing at Buffalo, in the county of Erie and State of New York, have invented certain new and useful Improvements in Current Water-Wheels; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in water wheels and more particularly to that class in which the paddles are exposed to the impulse of the current of a stream or raceway.

The object of my invention is to provide a construction in which there is absolutely no back pressure of water upon the paddles, and whereby the paddles are only exposed when they are receiving the impulse of the current, being sheathed at all other times during their revolution.

To that end my invention consists in certain details of construction, all of which will be more fully hereinafter described and claimed.

In the drawings, Figure 1 is a central vertical section of my improved wheel and its adjuncts. Fig. 2 is a top plan view showing a partial horizontal section, taken in the line *x—x* of Fig. 1. Fig. 3 is a partial vertical section, taken in the line *y—y* of Fig. 2. Fig. 4 is a detached detail of the tightening band and lever, constituting the brake. Fig. 5 is a fragmentary vertical section through one of the paddles and the auxiliary gate for closing the opening through which the paddle is projected into its operative position. Fig. 6 is a detail elevation of the unshipping device, partly in section. Fig. 7 is a horizontal section, taken in the line *z—z* of Fig. 5.

Referring to the drawings, 1 is the casing, preferably of concrete or masonry construction, and designed to be built along the side of, or in a running stream or raceway, the current of which is to be utilized for the development of power. The side of this casing 1, exposed to the current, is left open, such opening being provided with the gate 2, which is slidable vertically in and out of the vertical channels 3, 3, in the casing 1.

4 is a cylindrical drum, with closed bottom 5, its top being left open. Centrally arranged within the drum, is the vertical tube or casing 6, which loosely surrounds the stationary vertical shaft 7, around which the drum 4 is intended to be revolved. The lower square end 8 of shaft 7 rests fixedly in the socket 9, within which are arranged a series of friction-balls 10, against which the drum 4 rests, when in its lowest position. The upper end of shaft 7 rests rigidly in the covering-plate 11, which is supported in an elevated position on the casing 1, by the posts 12. It will be seen that the drum 4 is closely surrounded by the casing 1 except at its open side, as clearly shown in Fig. 2. I have preferably shown the drum 4 as revolving around a stationary shaft, this being, in my judgment, the most practicable form, but, if desired, the drum might be rigid with the shaft, in which event, its upper and lower ends must be revoluble in their sockets. Within the drum are arranged a series of radial vertical paddles 13, herein shown as five in number. The upper and lower edges of these paddles are slidable in channeled supports 14, 15, in which are arranged the spaced friction-rollers 16. These paddles 13 pass in and out of the drum 4, through the vertical openings 17 and in order to provide an extended bearing, as well as a water-tight joint, I have secured on each side of such openings 17 and within the drum, the angle-plates 18, 18, having the vertical channels 19, 19, opening onto the paddles and filled with suitable packing material for carrying a lubricant supplied from the cups 20. Each paddle 13 is reciprocated in and out of the drum 4 by the piston-rod 21, hinged to such paddle at its outer end and to a piston-head within the cylinder 22. The cylinders 22, five in number, are supplied with compressed air, as a motive force, from the common reservoir 23, through the common pipe 24 and the branch pipes 25, which lead separately to the valve-boxes 26.

27 is the pump which compresses the air in the reservoir 23. The piston-rod 28 of the pump is journaled to the eccentric-pin 29 of the bevel-gear 30 mounted on shaft 31, which is journaled in the bracket 31ª, rigidly mounted on the tube or casing 6. The bevel-gear 30 intermeshes with the bevel-gear 32, rigidly mounted on the frame 33, the inner end of which loosely encircles the stationary shaft 7, with ball-bearings 33ᵃ to facilitate an easy vertical movement of the frame 33 on the stationary shaft 7. Its outer end 34 slidably engages the shaft 35.

36 is a gear-wheel feathered on the shaft 35 and intermeshing with the gear 37 on the drum 4.

The upper end of shaft 35 is journaled in the covering plate 11 and on its upper end is rigidly mounted the bevel-gear 38, which intermeshes with the bevel-gear 39 on the power shaft 40. A ratchet-escapement of any well known form is contained in the casing 41.

The means which I have employed for stopping the rotation of the drum consists of a brake mechanism constructed and arranged as follows: 42 is a friction-band, one end of which is attached to the brake-lever 43 provided with the locking segmental-gear 44. The other end of the friction-band is fixedly secured to the framework.

The automatic mechanism for regulating the action of the piston-rods 21, for presenting the paddles 13 to the action of the current across the open side of the casing 1 and for sheathing the same within the drum at the proper time, is arranged as follows: 45 is the valve-rod, extending up from the valve-box 26 and having its upper end journaled in the channeled support 14. On its upper end is rigidly secured the crank-arm 46. 47 is a pitman, pivoted at one end to the crank-arm 46 and at its other end to a slide-plate 48, adapted to be reciprocated between the ways 49, 49, on the channeled support 14. At the outer end of the slide-plate 48 is the upwardly extending pin 50. 51, 51 are two arms extending radially from the bevel-gear 32 toward the opposite sides of the opening in the casing 1, having at their outer ends the sockets 52. 53 is a rod adapted for adjustable engagement with the socket 52, its upper end being provided with the annular shoulder 53ᵃ, and its lower end carrying the angular shifting-plate 54, adapted for operative engagement with the pins 50. Within the upper end of rod 53 is the socket 55, see Fig. 6, in which is slidably engaged the rod 56, which extends up through the covering-plate 11 and post 57. The upper end 58 of the rod 56 is screw-threaded and 59 is a hand-wheel in engagement with the rod 56, for raising and lowering the same, and with it the rod 53. A bolt 60 passing through the socket 52 and riding in an elongated slot 61 in the rod 56, prevents the rod 56 from becoming detached from the rod 53 and at the same time permits of the raising of both rods 53 and 56, by a manipulation of the hand-wheel 59.

In operation, the current of the stream is supposed to be flowing past the open side of the casing 1, from right to left. As the paddle 13, which is approaching the upper or right-hand end of the opening, reaches the shifting-plate 54, the pin 50, which is at its extreme outer point, strikes such shifting-plate and is forced inward, as illustrated in dotted lines. This movement actuates the pitman 47, which causes the crank-arm 46 to operate the valve of cylinder 22. The compressed air is admitted behind the piston-head attached to the piston-rod 21. The outward movement of such piston-rod forces the paddle 13 out into contact with the passing current of water, which is exerted against the same until the pin 50 reaches the other shifting-plate 54, which causes such pin to be forced outwardly, as clearly shown in dotted lines. The outward movement of pin 50 operates the cylinder-valve as before and the exposed paddle is sheathed within the drum at the moment that it approaches the lower or left-hand side of the opening in the casing 1, where it will remain sheathed until it again approaches the point at which the current is to be utilized. In this manner, each paddle becomes operative only across the opening in the casing, it being sheathed within the drum, during the rest of its travel within the casing.

The effect accomplished with my improved wheel is that the entire force of the current is utilized against the paddles and as each paddle is sheathed when it leaves the current and remains so until it again reaches the running water, there is absolutely no back-pressure, the result being that the maximum force of the current is utilized. The revolution of the gear 30 furnishes the power to operate the pump 27, thereby maintaining a constant supply of compressed air in the reservoir 23, with which to operate the piston rods 21, in reciprocating the paddles 13 into their operative and idle positions, as has already been described. When it becomes necessary to stop the rotation of the drum, for repairs or for any other purpose, the lever 43 is turned, which tightens the friction-band 42 around the drum and stops the same, the ratchet-escapement permitting the power shaft 40 to continue its revolution without interruption, thereby permitting it to receive the impulse of other power-wheels, should a battery of them be employed. In the event of stopping the drum for repairs, I have provided an extra precaution for keeping out the water from the interior of the drum, which is shown in detail in Figs. 5 and 7, in which 63 is a recessed plate bolted to the outside of the drum in front of the elongated slots 17, through which the paddles 13 are reciprocated. These plates are provided on their outer faces with elongated slots 64, corresponding in size and registering with the slots 17, for the passage therethrough of the paddles 13. 65 are elongated gates adapted to be passed down snugly between the recessed plates 63 and the side of the drum and against the elongated slots 17 and 64, thus serving as an additional guard for preventing the entrance of water into the drum. The drum, as shown, is free to move upwardly with a rise of the stream owing to the buoyant effort of the water and should such rise occur, the rods 53, carrying the shifting-plates 54 and having their annular shoulders 53ª resting upon the sockets 52, will ride upwardly with the drum, the rod 56 which is rigid sinking into the slot 55 in the rod 53. The shifting-plates 54 can at any time be raised above the plane of revolution of the pins 50, by a proper manipulation of the hand-wheel 59.

My improved wheel may be placed in a running stream, away from its banks, with equally effective results, or it can be placed at the side of a straight artificial raceway.

With my improved construction the current passes in a direction tangential to the drum at the open side of the casing, the paddles being presented to the force of the current only in their travel across the open side of the casing, being sheathed at all other points of their travel. This taken in conjunction with the fact that the casing closely surrounds the drum except at its open side, precludes the possibility of any danger of clogging from floating ice or driftwood.

I claim:

1. In a current water-wheel, in combination, a hollow drum provided with openings in its wall, a casing closely surrounding the drum and open on the side exposed to the current, a plurality of paddles within the drum adapted for outward movement into the current through the openings of the drum, and means constructed and arranged to successively project one paddle at a time into the current across the opening in the side of the casing and sheathing the remaining paddles within the drum during the projection of one paddle.

2. In a current water-wheel, in combination, a hollow drum provided with openings in its wall, a casing closely surrounding the drum and open on the side exposed to the current, a plurality of unconnected paddles within the drum adapted for outward movement into the current through the openings of the drum, and means constructed and arranged for projecting one paddle at a time into the current across the open side of said casing and sheathing the same within the drum during the remainder of its travel.

3. In a current water-wheel, in combination, a vertical hollow drum provided with spaced openings in its wall, a casing surrounding the drum and open on the side exposed to the current, a series of unconnected radial vertical paddles within the drum adapted for outward movement into the current through said vertical openings and across the open side of said casing, and means constructed and arranged for projecting one paddle at a time into the current across the open side of said casing and sheathing such paddle within the drum during the remainder of its travel and maintaining such paddle stationary when sheathed within the drum until again projected.

4. In a current water-wheel, in combination, a hollow drum provided with openings in its wall, a casing surrounding the drum and provided with an opening, a plurality of paddles within the drum adapted for outward movement through the openings in the drum and across the opening in the casing, and means constructed and arranged to reciprocate said paddles and to project one paddle at a time across the opening in the casing and to draw such paddle into the drum wherein it is sheathed until again projected, each paddle being held stationary while projected.

5. In a current water-wheel, in combination, a hollow drum provided with openings in its wall, a casing surrounding the drum and provided with an opening, a plurality of paddles within the drum adapted for outward movement through the openings in the drum and across the opening in the casing, and means constructed and arranged to reciprocate said paddles and to project one paddle at a time across the opening in the casing and to draw such paddle into the drum wherein it is sheathed until again projected, each paddle being held stationary while projected and each paddle being held stationary while sheathed within the drum.

6. In a current water-wheel, in combination, a hollow drum provided with openings in its wall, a casing surrounding the drum and provided with an opening, a series of unconnected paddles within the drum adapted for outward movement through the openings in the drum and across the opening in the casing, and means constructed and arranged to project one paddle at a time across the opening in the casing and maintain the projected paddle stationary while projected against accidental lateral displacement or inward movement under the influence of the current, the projected paddle being capable of receding into the drum if contacted with by heavy ice-floes.

7. In a current water-wheel, in combination, a hollow drum provided with openings in its wall, a plurality of paddles within the drum adapted for outward movement through the openings therein, and means constructed and arranged to reciprocate said paddles and to project one paddle at a time through the corresponding opening in the drum and to draw such paddle into the drum wherein it is sheathed until again projected, each paddle being movable for operation only when being projected and when being drawn into the drum.

8. In a current water-wheel, in combination, a stationary vertical shaft, a vertically movable drum mounted for rotation upon said shaft, a casing surrounding the drum and provided with an opening which is exposed to the current, the drum having a plurality of openings in its walls, a plurality of paddles arranged within the drum with respect to said openings, in the drum, and means constructed and arranged for projecting one paddle at a time through the corresponding opening of the drum and beyond the opening of the casing and into the current and sheathing such paddle when out of contact with the current as the drum rises and falls on the stationary vertical shaft.

9. In a current water-wheel, in combination, a hollow drum provided with openings in its wall, a plurality of paddles within the drum adapted for reciprocation into and out of the drum through the openings in the wall of the latter, and means constructed and arranged to successively project one paddle at a time into the current and sheathing the paddles within the drum during projection of one paddle at a time, whereby each paddle is confined within the drum during all of its travel except when projected from the drum.

10. In a current water-wheel, in combination, a vertical hollow drum provided with spaced vertical openings in its wall, a concentric casing closely surrounding such drum and open on the side exposed to the current, a series of radial vertical paddles within the drum adapted for outward movement into the current through the vertical openings, and means for automatically projecting each paddle into the current across the open side of the casing and sheathing the same within the drum, during the remainder of its travel.

11. In a current water-wheel, in combination, a stationary vertical shaft, a hollow drum provided with spaced vertical openings in its wall revolving upon such shaft, a concentric casing closely surrounding such drum and open on the side exposed to the current, a series of radial vertical paddles within the drum adapted for outward movement into the current through the vertical openings, and means for automatically projecting each paddle into the current across the open side of the casing and sheathing the same within the drum, during the remainder of its travel.

12. In a current water-wheel, in combination, a stationary vertical shaft, a vertically movable hollow drum provided with spaced vertical openings in its wall revolving upon such shaft, a concentric casing closely surrounding such drum and open on the side exposed to the current, a series of radial vertical paddles within the drum adapted for outward movement into the current through the vertical openings, and means for automatically projecting each paddle into the current across the open side of the casing and sheathing the same within the drum, during the remainder of its travel.

13. In a current water-wheel, in combination, a stationary vertical shaft, a hollow drum revolving upon such shaft and provided with spaced vertical openings in its wall, a concentric casing closely surrounding such drum and open at the side exposed to the current, a series of radial vertical paddles adapted for outward movement through the vertical openings in the wall of the drum, motors within the drum for separately reciprocating the paddles into and out of operative position and a pump communicating with and operating the separate motors, such pump receiving its impulse from the revolving drum.

14. In a current water-wheel, in combination, a stationary vertical shaft, a hollow drum revolving upon such shaft and provided with spaced vertical openings in its wall, a concentric casing closely surrounding such drum and open at the side exposed to the current, a series of radial vertical paddles adapted for outward movement through the vertical openings in the wall of the drum, motors within the drum for separately reciprocating the paddles into and out of operative position, a pump communicating with and operating the separate motors, such pump receiving its impulse from the revolving drum, and automatic means connected with the separate motors and the permanent framework and operated by the revolving drum for controlling the motors.

15. In a current water-wheel, in combination, a stationary vertical shaft, a vertically movable hollow drum revolving upon such shaft and provided with spaced vertical openings in its wall, a concentric casing closely surrounding such drum and open at the side exposed to the current, a series of radial vertical paddles adapted for outward movement through the vertical openings in the wall of the drum, motors within the drum for separately reciprocating the paddles into and out of operative position and a pump communicating with and operating the separate motors, such pump receiving its impulse from the revolving drum.

16. In a current water-wheel, in combination, a stationary vertical shaft, a vertically movable hollow drum revolving upon such shaft and provided with spaced vertical openings in its wall, a concentric casing closely surrounding such drum and open at the side exposed to the current, a series of radial vertical paddles adapted for outward movement through the vertical openings in the wall of the drum, motors within the drum for separately reciprocating the paddles into and out of operative position, a pump communicating with and operating the separate motors, such pump receiving its impulse from the revolving drum, and automatic means connected with the separate motors and the permanent framework and operated by the revolving drum for controlling the motors.

17. In a current water wheel, the combination with a casing provided with an opening exposed to the current; of a drum mounted for rotation within the casing and provided with a series of openings; paddles confined normally within the drum with respect to the openings of the latter for radial projection through the corresponding openings; and means for projecting one paddle at a time through the corresponding opening of the drum and beyond the opening in the casing.

18. In a water motor, a rotatable casing, a driving blade adapted for reciprocation through the sides of the casing, and means for operating the blade at predetermined points, said means consisting of a cylinder having a piston therein and attached to the stem of the blade whereby when compressed air is supplied to one end of the cylinder, the blade is operated in one direction, and when applied to the opposite end the blade is operated in the opposite direction, and means for controlling the supply of compressed air to the cylinder.

19. In a current water wheel, the combination with a casing provided with a single opening which is exposed to the current, of a drum mounted for rotation within the casing and provided with a plurality of openings, paddles within the drum arranged with respect to the openings of the latter for radial projection through the corresponding openings, and means for projecting one paddle at a time through the corresponding opening of the drum and beyond the opening of the casing, the remaining paddles being confined wholly within the drum during the said projection of one of them.

20. In a current water wheel in combination with a stationary vertical shaft, a vertically movable drum mounted for rotation on said shaft, a casing surrounding the drum and provided with an opening which is exposed to the current, the drum having a plurality of vertical openings in its walls, paddles arranged within the drum with respect to said openings in the drum, and means for automatically projecting each paddle through the corresponding opening of the drum and beyond the opening of the casing and into the current and shielding the paddles when out of contact with the current as the drum rises and falls on the stationary vertical shaft.

In testimony whereof, I have signed my name to this specification, in the presence of two subscribing witnesses.

THEOPHILUS SYMMONDS.

Witnesses:
CHAS. J. GARVEY,
W. T. MILLER.

---

Copies of this patent may be obtained for five cents each, by addressing the "Commissioner of Patents, Washington, D. C."